Figure 1:
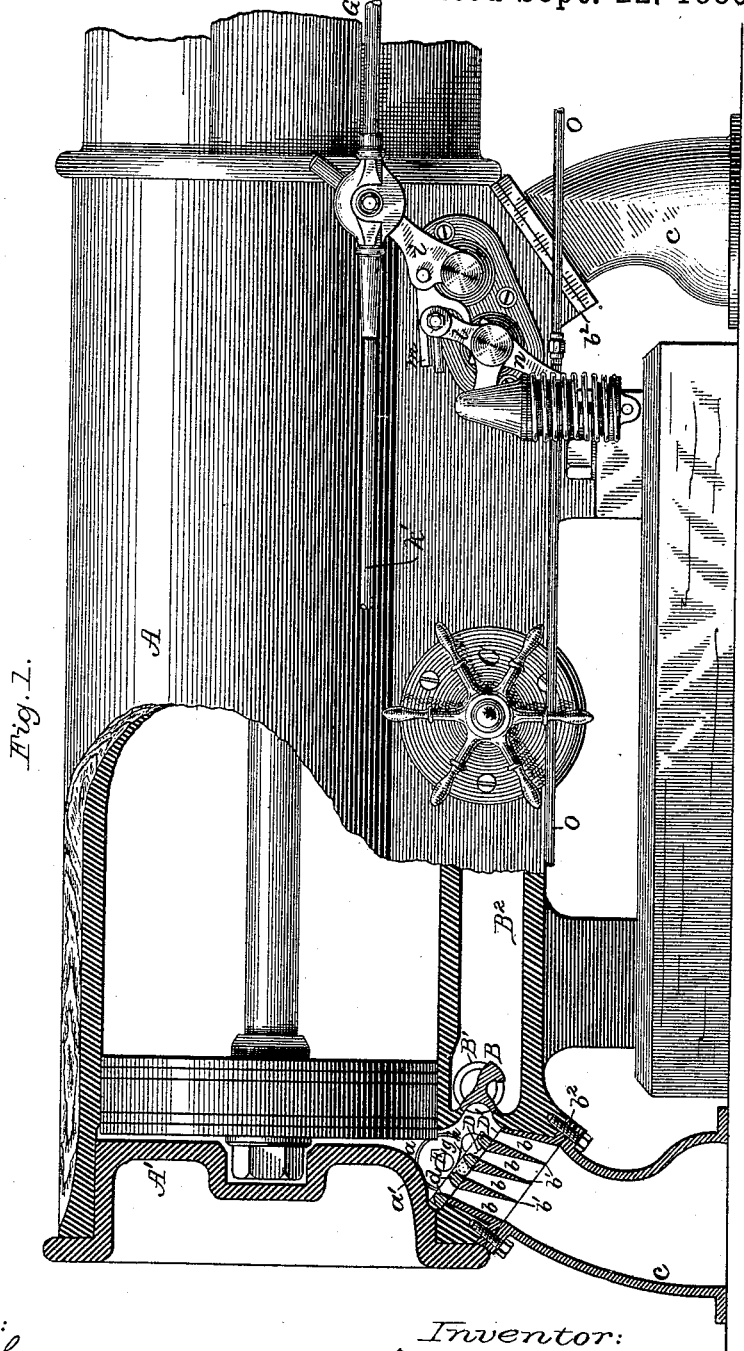

(No Model.) 2 Sheets—Sheet 1.

J. WHEELOCK.
VALVE GEAR FOR STEAM ENGINES.

No. 326,819. Patented Sept. 22, 1885.

Attest:
Philip F. Larner
Lowell Bartle

Inventor:
Jerome Wheelock
By McCmod
Attorney.

(No Model.) 2 Sheets—Sheet 2.

J. WHEELOCK.
VALVE GEAR FOR STEAM ENGINES.

No. 326,819. Patented Sept. 22, 1885.

Attest:
Philip F. Larner
Nowell T. Bartle

Inventor:
Jerome Wheelock
By his Attorney

UNITED STATES PATENT OFFICE.

JEROME WHEELOCK, OF WORCESTER, MASSACHUSETTS.

VALVE-GEAR FOR STEAM-ENGINES.

SPECIFICATION forming part of Letters Patent No. 326,819, dated September 22, 1885.

Application filed November 8, 1884. (No model.)

*To all whom it may concern:*

Be it known that I, JEROME WHEELOCK, of the city and county of Worcester, in the State of Massachusetts, have invented certain new and useful Improvements in Valve-Gear for Steam-Engines; and I do hereby declare that the following specification, taken in connection with the drawings furnished and forming a part of the same, is a clear, true, and complete description of my invention.

The prime object of my invention in its best form is to secure all the advantages incident to the use of valve-gear heretofore patented by me, coupled with such other advantages as must obviously accrue from a free, prompt exhaust, and enabling the exhaust-valves to fully operate under a minimum extent of movement. My said valve-gear constitutes the subject of my Letters Patent No. 144,174, dated October 2, 1873, wherein I have shown and described the same as organized for use in connection with semi-rotating valves, and also with slide-valves, and although certain of the features therein claimed were not limited by the character of valve employed, the embodiment, in any one steam-engine, of valves of the two varieties named, was not therein indicated, nor was it at that time contemplated by me. I have now devised a combination, including both semi-rotating steam-valves and slide-valves, one of each variety co-operating with one of the other variety, in conjunction with each of two cylinder-ports, and all four of said valves are operated by my valve-gear and one eccentric. In my former organizations "clearance" is, as I believe, reduced to a minimum, and that valuable feature is in no manner impaired in my present engine. In my engines as heretofore organized each exhaust-valve is moved by the eccentric during the entire longitudinal movement of the eccentric-rod; but as now devised by me each exhaust-valve is capable of resting during a portion of the movement of the eccentric-rod, and the extent of movement by said valve is thereby reduced to a minimum, and by using a gridiron slide-valve I provide for an extensive area of exhaust-port, which can be thoroughly controlled by the valve notwithstanding its limited range of movement. As a result of my said improvements, my present engines are not only as well adapted to ordinary service as those heretofore built by me, but they are enabled to perform high-speed service much more effectively, and with as great or greater economy than any other type of high-speed engine known to me. Broadly considered, I deem it a new and valuable feature to combine, in conjunction with one cylinder-port, a semi-rotating steam-valve and an exhaust slide-valve; and I have so organized such valves that both can be controlled in harmony by one eccentric regardless of the special character of the slide-valve, although said combination is of still greater value if the slide-valve be of the well-known gridiron variety. I also deem it broadly new and valuable to combine a semi-rotating steam-valve and any exhaust-valve possessing the general characteristics of a gridiron-valve, and which is so operated from a rock-shaft as to enable said valve to rest during a portion of the movement of said shaft, and said combination in its best form includes a rock-shaft, and a gridiron slide-valve connected to the rock-shaft by means of a link, and so organized that although said shaft be rocked in regular time, the valve will be moved at each stroke at varying speed, and be at rest during a portion of the rocking movement of the shaft.

After a full description of engines embodying my invention the features deemed novel will be specified in the several claims hereunto annexed.

Figure 2:
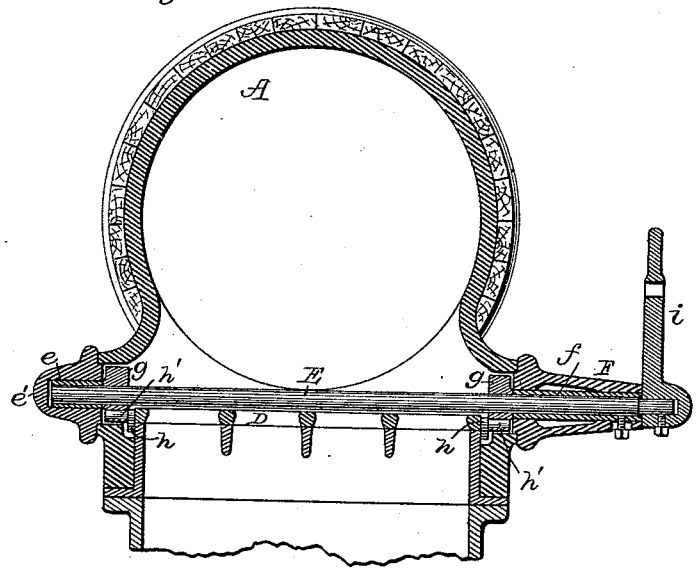
Figure 3:
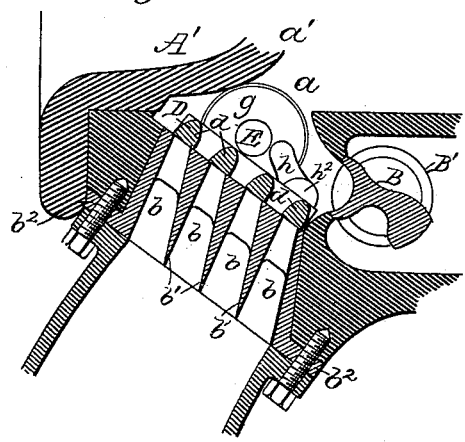
Figure 4:
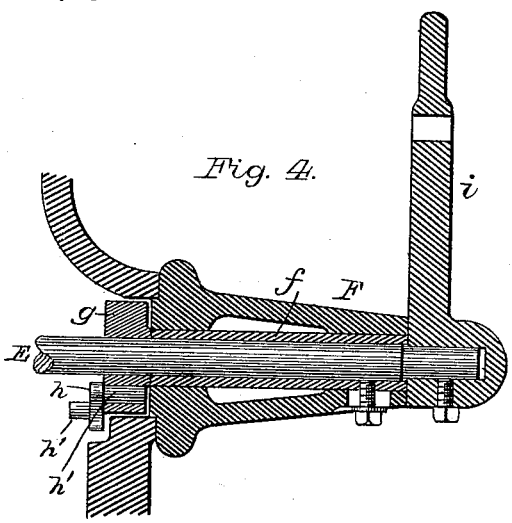
Figure 5:
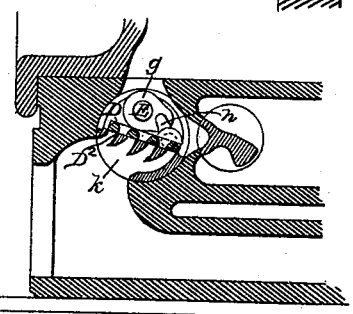

Referring to the two sheets of drawings, Figure 1 illustrates, partially in side elevation and partially in longitudinal vertical central section, a steam-engine cylinder embodying my present invention in what I deem to be its best form. Fig. 2 is a vertical lateral section of the same on line *x*, Fig. 1. Fig. 3 illustrates the valves and their seats in section, as shown in Fig. 1, but on an enlarged scale. Fig. 4 is an enlarged view of the lower right-hand portion of Fig. 2. Fig. 5 illustrates how I apply exhaust slide-valves according to my present invention to engines as heretofore constructed by me, after the removal therefrom of the semi-rotating exhaust-valves heretofore used.

The engine-cylinder A has, as heretofore, at each end on its lower side a port, a, which serves both for the induction and eduction of steam, and said ports are located so nearly to the ends of the cylinder that the cylinder-heads A' are recessed internally at their lower sides, as at a', to afford inclined or curved upper walls to said ports.

It is to be understood that Figs. 1 to 4, inclusive, illustrate parts of a new engine, as constructed with my present improvements, and that said parts, as shown, indicate substantially the same relative proportions as have been practically employed by me in the construction of engines with twenty-six-inch by sixty-inch cylinders.

The semi-rotating steam-valve B and its cylindrical chamber B', the steam-chest B², and throttle-valve and its hand-wheel C are substantially as heretofore constructed by me, and as disclosed in my prior Letters Patent Nos. 144,174 and 249,864. The slide-valve D constitutes the novel element in this combination with the semi-rotating steam-valve. As seen in Fig. 1, the valve-seat D' is of the gridiron variety, having therein numerous openings, b, and suitable bars and webs, b'. In its best form the whole seat D' is cast in one piece, having sides and ends, and forming a rectangular hollow structure with flanges b² at its outer end, so that when inserted into an opening provided therefor in the cylinder-casting, it may be secured in position by means of bolts or screws, which also secure the mouth of the exhaust-pipe elbow c to the cylinder. This exhaust-pipe elbow merges from a substantially rectangular cross-section at its top to a cylindrical cross-section at its lower end, as is clearly indicated.

The several openings b in the valve-seat afford an aggregate area of exhaust-port of such extensive proportions as to be more than ample for exhausting steam from the cylinder while the steam-valves are operating independently of the cut-off. This exhaust-valve D is of the gridiron variety, having bars d and webs corresponding to the bars and webs of the valve-seat in a manner well known.

For operating the slide-valve, I employ a rock-shaft, E, which is loosely coupled to said valve. Said rock-shaft has at one end a bushing-bearing, e, which is inclosed within a tight cap, e', bolted to the cylinder-casting. At its opposite end said shaft occupies a similar bushing-bearing, f, within the hub of a bonnet, F, which in like manner is provided with a hub within which one end of the spindle of the semi-rotating steam-valve B is similarly mounted. Within the valve-chamber the rock-shaft is provided with two crank-disks, g, which serve as arms, by which and by a link, h, the valve D is coupled to the rock-shaft. The disk g which is near the outer or protruding end of the rock-shaft serves also to afford a steam-tight joint against the inner end of the bearing-bushing f, and therefore I prefer said disks, although mere arms could be employed without departure from certain portions of my invention. Each link h has wrist-pins h' at each end thereof, but projecting in opposite directions, so that one of said pins occupies a hole or bearing therefor in the crank disk or arm g, and the other occupies a similar hole or bearing in a lug, h², on the valve D. As thus far described, it will be seen that the semi-rotation of the rock-shaft causes a sliding movement of the valve D upon its seat, and said rock-shaft has precisely the same rocking movement as that of the spindle of the semi-rotating exhaust-valve heretofore employed by me, because, as with said prior valve, this rock-shaft is coupled to the steam-valve by the same cut-off gear as heretofore, and is vibrated by the eccentric-rod G, which is coupled to the rock-shaft arm i, in substantially the same manner as in my prior engines. My prior semi-rotating exhaust-valve was also necessarily in motion throughout the entire longitudinal movement of the eccentric-rod; but with the exhaust-valve as now organized by me it will be seen that with the disk or arm g and link a knuckle-joint or "toggle-lever" connection is afforded between the rock-shaft and valve, and that, therefore, after the valve has wholly closed its port, the rock-shaft can be somewhat further rocked without resulting in a further movement of said valve. With the said prior semi-rotating exhaust-valve, only such speed can be afforded in its opening and closing movements as will correspond to the vibratory movement of its arm when vibrated by the eccentric-rod; but it will be seen that this slide-valve opens slowly, then moves rapidly, then stops, and then closes rapidly. With these two provisions for a rest of the exhaust-valve and for its variation in speed, and with the gridiron feature, it will be seen that the extent of movement by said valve can be and is reduced to a minimum, and that it will be securely closed before the steam-valve will operate in uncovering its port, and also that it cannot possibly be opened until after the engine has passed its center during its proper stroke, thus enabling the engine to effectively and economically operate at high speed.

Now, referring to Fig. 5 it is to be understood that I thereby intend to illustrate how one of my prior engines having a semi-rotating exhaust-valve can be economically provided with a slide-valve in accordance with my present invention. In this case the prior exhaust-valve occupies a tapering cylindrical chamber. To this chamber I fit a corresponding tapering shell, k, having disk-shaped heads, and a flat gridiron-valve seat, D², corresponding generally with the seat D', before described. The gridiron-valve D is also substantially as hereinbefore described. Above the valve a rock-shaft, E, is introduced, so as to occupy at its ends the bearings within the bushings which were before occupied by the ends of the valve-spindle, and said shaft is coupled to the valve by arms or disks g and links h, as before described. It will of course be understood that the two rock-shaft arms i are coupled together by the rod $k'$, as heretofore, and that the eccentric rod G is coupled to the arm $i$ which is nearest the inner end of the cylinder, as heretofore, although the hook-connection by which the eccentric-rod is coupled to said arm is of novel construction; but that has no special relation to the invention described.

The combination of the arms $i$, steam-valve arms $l$, the latch-links $m$, cam-levers $n$, and the rod $o$, which connects both cam-levers with the governor, is substantially as heretofore, and, as shown in Fig. 1, it differs only in such matters of relative arrangement as are incident to the location of the slide-valve rock-shaft in a plane above that occupied by the steam-valve axis or spindle, instead of in the same plane, as heretofore; but with the organization illustrated in Fig. 5 said combination would be precisely as heretofore.

While I do not limit myself thereto, the inclination of the exhaust valve seat, as shown in Fig. 1, is specially desirable, because the valve is thereby located as nearly as possible to the interior of the cylinder.

It is to be distinctly understood that while I prefer the valves constructed and operated as shown and particularly described, I am aware that fairly desirable results will accrue by the use of the combination, with a steam-cylinder, of a sliding exhaust-valve and a semi-rotating steam-valve, regardless of the gridiron feature, and also regardless of the particular manner of gearing them to the crank-shaft of an engine or of enabling the steam-valves to be controlled by the governor; and I am also aware that approximately desirable results will accrue if the gridiron feature be employed with the exhaust-valve, whether this latter be a sliding valve or a semi-rotating valve, provided it be so coupled to the eccentric-rod that it can rest during a portion of the longitudinal movement of said rod, as described.

Having thus described my invention, I claim as new and desire to secure by Letters Patent—

1. At each end of a steam-engine cylinder, the combination, substantially as hereinbefore described, of an eccentric-rod, a semi-rotating steam-valve, and a sliding exhaust-valve cooperating therewith for controlling one cylinder-port.

2. At each end of a steam-engine cylinder, the combination, substantially as hereinbefore described, of a semi-rotating steam-valve and a gridiron-valve loosely coupled to an eccentric-rod, whereby during a portion of the longitudinal movement of said rod said exhaust-valve will remain at rest.

3. At each end of a steam-engine cylinder, the combination, substantially as hereinbefore described, of a semi-rotating steam-valve and a gridiron sliding exhaust-valve, which is coupled to a rock-shaft, and an eccentric-rod which is coupled to all of said valves.

4. In a steam-engine, the combination, substantially as hereinbefore described, of a semi-rotating steam-valve, a gridiron-slide exhaust-valve, and a rock-shaft coupled to said exhaust-valve by means of disks or arms and links, whereby said two valves may be operatively coupled to one eccentric-rod and the exhaust-valve permitted to rest in a closed position during a portion of the longitudinal movement of said rod.

JEROME WHEELOCK.

Witnesses:
GEO. H. SOUTHWICK,
HENRY A. WINN.